(12) United States Patent
Yamasaki

(10) Patent No.: US 6,808,113 B2
(45) Date of Patent: Oct. 26, 2004

(54) CLOCK FREQUENCY CONTROL METHOD AND DEVICE, AND IC CARD READING/WRITING APPARATUS USING THE SAME

(75) Inventor: Hideo Yamasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 229 days.

(21) Appl. No.: 10/060,391

(22) Filed: Feb. 1, 2002

(65) Prior Publication Data

US 2003/0024984 A1 Feb. 6, 2003

(30) Foreign Application Priority Data

Aug. 1, 2001 (JP) .......................................... 2001-234055

(51) Int. Cl.[7] .................................................. G06K 7/08
(52) U.S. Cl. ........................ 235/451; 235/441; 235/436
(58) Field of Search ................................ 235/451, 441, 235/436, 380, 492

(56) References Cited

U.S. PATENT DOCUMENTS

| | | | | | |
|---|---|---|---|---|---|
| 4,803,351 A | * | 2/1989 | Shigenaga | .................. | 235/492 |
| 5,070,233 A | * | 12/1991 | Takizawa et al. | ........... | 235/380 |
| 5,099,141 A | * | 3/1992 | Utsunomiya | ................. | 327/99 |
| 5,585,617 A | * | 12/1996 | Ohbuchi et al. | ............ | 235/491 |
| 5,712,881 A | * | 1/1998 | Iijima | .......................... | 375/354 |
| 5,832,778 A | * | 11/1998 | Will | ............................. | 74/391 |
| 5,875,321 A | * | 2/1999 | Sengoku | ..................... | 713/501 |
| 5,926,044 A | * | 7/1999 | Niimura | ....................... | 327/99 |
| 6,035,357 A | * | 3/2000 | Sakaki | ........................ | 710/301 |
| 6,600,575 B1 | * | 7/2003 | Kohara | ........................ | 358/406 |

FOREIGN PATENT DOCUMENTS

| | | | | |
|---|---|---|---|---|
| JP | 05-083101 | 2/1993 | | |
| JP | 08321750 A | * 12/1996 | ............ | H03K/5/00 |

* cited by examiner

*Primary Examiner*—Michael G. Lee
*Assistant Examiner*—Uyen-Chau N. Le
(74) *Attorney, Agent, or Firm*—Arent Fox, PLLC

(57) ABSTRACT

In a clock frequency controlling method and method, a plurality of clock output selectors are provided to respectively provide output clock signals based on input clock signals with different frequencies at respective selector inputs. One of the plurality of clock output selectors is controlled in response to an operating clock request to provide a selected clock signal among the output clock signals in accordance with an indication of the request. When the first indication of the request is changed to a second indication, the selected clock signal is deactivated in synchronism with a corresponding one of the input clock signals. After the selected clock signal is deactivated, a second selected clock signal is activated in response to the second indication of the request in synchronism with a corresponding one of the input clock signals.

7 Claims, 7 Drawing Sheets

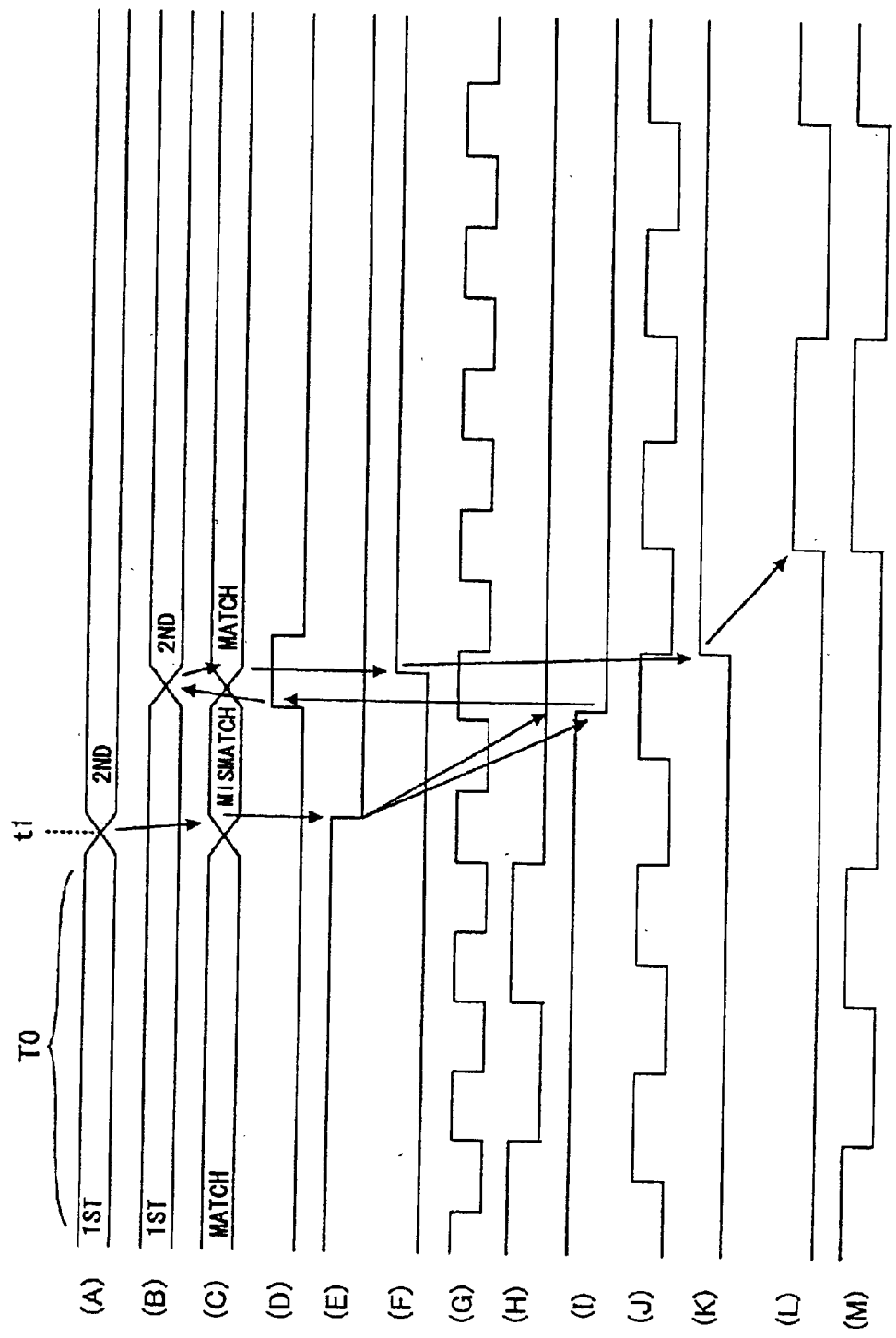

CLOCK FREQUENCY CONTROL METHOD AND DEVICE, AND IC CARD READING/WRITING APPARATUS USING THE SAME

BACKGROUND OF THE INVENTION

1. Field of the Invention

The present invention relates to a clock frequency control method and device which selectively outputs one of various clock signals with different frequencies to access an IC card of a certain kind such that the selected clock frequency is suited to the IC card of the kind. Moreover, the present invention relates to an IC card reading/writing apparatus using the clock frequency control device.

2. Description of the Related Art

Conventionally, there are two methods of changing one of a plurality of clock frequencies to another while preventing the occurrence of a spike-like signal. That is, one method is to change a frequency-dividing factor, which is used to convert the same clock frequency into a controlled clock frequency, so that the controlled clock frequency is output (which method will be referred to as the first method). As disclosed in Japanese Laid-Open Patent Application No. 5-83101, the other method is that one of two non-synchronized clock signals is changed to the other or vice versa, and the resulting clock signal is output (which method will be referred to as the second method).

However, according to the standards of IC (integrated circuit) cards, various kinds of IC cards which work with different clock frequencies are permitted. In addition, a variety of clock frequencies for IC cards are defined by the IC card standards. Among such IC card standards is the Japanese Industrial Standards (JIS) X 6304: 1999. In order to achieve accessing the IC card of every kind, it is necessary that an IC card reading/writing apparatus be provided with the function to change one of a plurality of clock frequencies, specified for such IC cards, to another.

When producing an operating clock signal specified for an IC card by changing the frequency-dividing factor for a certain oscillation frequency according to the first method, the first method has the problem in that it is difficult to set the frequency-dividing factor at a predetermined value, and the specified clock frequency cannot be obtained.

Moreover, according to the IC card standards, an IC card reading/writing apparatus must satisfy the requirement that, when changing the original clock to a new clock, the creation of a clock signal with its pulse width, which is less than the pulse width of the original clock, should be inhibited.

The second method, which is disclosed in Japanese Laid-Open Patent Application No. 5-83101, provides the function to switch between the two non-synchronized clock signals with different frequencies. However, there is no teaching in Japanese Laid-Open Patent Application No. 5-83101 concerning the configuration of clock frequency control hardware that changes one of three or more clock signals with different frequencies to another and outputs the resulting clock signal, in order to enable the reading and writing of IC cards of various kinds.

SUMMARY OF THE INVENTION

An object of the present invention is to provide an improved clock frequency control method and device in which the above-described problems are eliminated.

Another object of the present invention is to provide a clock frequency control method which is capable of selectively outputting one of three or more clock signals with different frequencies without changing considerably the pulse width of the output clock signal before and after the clock frequency change.

Another object of the present invention is to provide a clock frequency control device which is capable of selectively outputting one of three or more clock signals with different frequencies without changing considerably the pulse width of the output clock signal before and after the clock frequency change.

Another object of the present invention is to provide an IC card reading/writing apparatus which includes a clock frequency control device configured to selectively output one of three or more clock signals with different frequencies without changing considerably the pulse width of the output clock signal before and after the clock frequency change.

The above-mentioned objects of the present invention are achieved by a clock frequency control method which comprises: the steps of providing a plurality of clock output selectors which respectively provide output clock signals based on input clock signals with different frequencies at respective selector inputs; and controlling one of the plurality of clock output selectors in response to an operating clock request to provide a selected clock signal among the output clock signals in accordance with a first indication of the request, wherein the controlling step includes: deactivating, when the first indication of the request is changed to a second indication, the selected clock signal in synchronism with a corresponding one of the input clock signals; and activating, after the selected clock signal is deactivated, a second selected clock signal in response to the second indication of the request in synchronism with a corresponding one of the input clock signals.

The above-mentioned objects of the present invention are achieved by a clock frequency control device comprising: a plurality of clock output selectors which respectively provide output clock signals based on input clock signals with different frequencies at respective selector inputs; and a controller which controls one of the plurality of clock output selectors in response to an operating clock request to provide a selected clock signal among the output clock signals in accordance with a first indication of the request, wherein the controller deactivates, when the first indication of the request is changed to a second indication, the selected clock signal in synchronism with a corresponding one of the input clock signals, and activates, after the selected clock signal is deactivated, a second selected clock signal in response to the second indication of the request in synchronism with a corresponding one of the input clock signals.

The above-mentioned objects of the present invention are achieved by an IC card reading/writing apparatus which includes a clock frequency control device for providing a computer system with read/write functions to read information from an IC card and to write information to the IC card, the clock frequency control device comprising: a plurality of clock output selectors which respectively provide output clock signals based on input clock signals with different frequencies at respective selector inputs; and a controller which controls one of the plurality of clock output selectors in response to an operating clock request to provide a selected clock signal among the output clock signals in accordance with a first indication of the request, wherein the controller deactivates, when the first indication of the request is changed to a second indication, the selected clock signal in synchronism with a corresponding one of the input clock signals, and activates, after the selected clock signal is deactivated, a second selected clock signal in response to the second indication of the request in synchronism with a corresponding one of the input clock signals.

The clock frequency control method and device of the present invention are effective in selectively outputting one of three or more clock signals with different frequencies in response to the operating clock request according to the kind of the inserted IC card, without changing considerably the pulse width of the output clock signal before and after the clock frequency change.

BRIEF DESCRIPTION OF THE DRAWING

Other objects, features and advantages of the present invention will become apparent from the following detailed description when read in conjunction with the accompanying drawings.

FIG. 7 is a timing chart for explaining operation of the clock frequency control circuit of the present embodiment.

DETAILED DESCRIPTION OF PREFERRED EMBODIMENTS

A description will now be provided of the preferred embodiments of the present invention with reference to the accompanying drawings.

Figure 1:
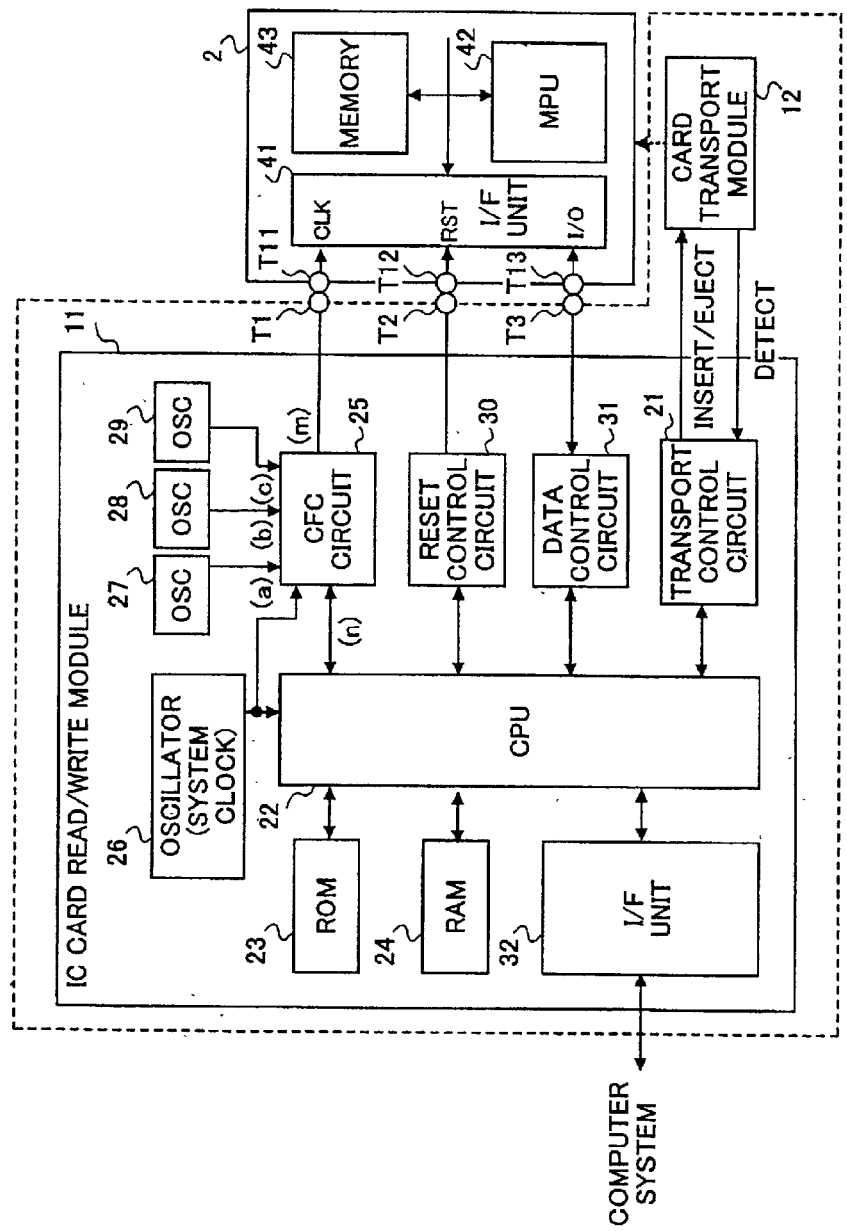
FIG. 1 is a block diagram of an IC card reading/writing apparatus in which one preferred embodiment of the clock frequency control method of the present invention is incorporated.

FIG. 1 shows an IC card reading/writing apparatus in which one preferred embodiment of the clock frequency control method of the present invention is incorporated.

As shown in FIG. 1, the IC card reading/writing apparatus 1 of the present embodiment is connected with a computer system (not shown). When an IC card 2 of a certain kind is inserted into an insertion slot (not shown) of the IC card reading/writing apparatus 1, the IC card reading/writing apparatus 1 provides the computer system with the read/write functions to read information from the IC card 2 and to write information to the IC card 2.

Suppose that there are three or more kinds of IC cards, each operating on the basis of one of three or more clock signals with different clock frequencies. By supplying a clock signal having the corresponding clock frequency suited to the kind of the IC card inserted, the IC card reading/writing apparatus 1 can provide the computer system with the read/write functions to access the IC card of the kind. The configuration of the IC card reading/writing apparatus 1 of the present embodiment will be described below.

As shown in FIG. 1, the IC card reading/writing apparatus 1 generally includes a read/write module 11 and a card transport module 12. The read/write module 11 includes a transport control circuit 21, a CPU (central processing unit) 22, a ROM (read-only memory) 23, a RAM (random access memory) 24, a clock frequency control (CFC) circuit 25, a system clock oscillator 26, a first clock oscillator 27, a second clock oscillator 28, a third clock oscillator 29, a reset control circuit 30, a data control circuit 31, and an interface (I/F) unit 32. The IC card 2 includes an interface (I/F) unit 41, an MPU (microprocessor unit) 42, and a non-volatile memory 43.

Moreover, the IC card reading/writing apparatus 1 has a clock contact T1, a reset contact T2 and a data contact T3, while the IC card 2 has a clock contact T11, a reset contact T12 and a data contact T13. When the IC card 2 is inserted and set at its active position, the read/write module 11 and the IC card 2 are electrically connected together at the clock contacts T1 and T11, the reset contacts T2 and T12, and the data contacts T3 and T13.

In the IC card reading/writing apparatus 1 of the present embodiment, when the IC card 2 is placed onto the insertion slot, the card transport module 12 detects the card insertion and sends a card-insertion detecting signal to the transport control circuit 21. When the card-insertion detecting signal from the card transport module 12 is received, the transport control circuit 21 sends a card insertion signal to the CPU 22. As the card insertion signal from the transport control circuit 21 is received, the CPU 22 controls the transport control circuit 21 to actuate a card loading motor (not shown) provided in the card transport module 12, so that the card transport module 12 transports the IC card 2 to the active position where the contacts T1 to T3 and the contacts T11 to T13 are brought into contact, by the actuation of the card loading motor.

Further, in the IC card reading/writing apparatus 1 of the present embodiment, when the card-insertion detecting signal from the card transport module 12 is received, the transport control circuit 21 sends a card insertion signal to the CPU 22. When the card insertion signal from the transport control circuit 21 is received at the CPU 22, the CPU 22 starts execution of a clock frequency control program, which is stored, in advance, in the ROM 23, and loaded from the ROM 23 onto the RAM 24 in response to the card insertion signal.

In the above-described embodiment, the IC card 2 is, when it is inserted, automatically transported to the active position by driving the card transport module 12. Alternatively, the IC card reading/writing apparatus 1 may be configured such that the IC card 2 is manually inserted and set to the active position by the operator.

Figure 2:
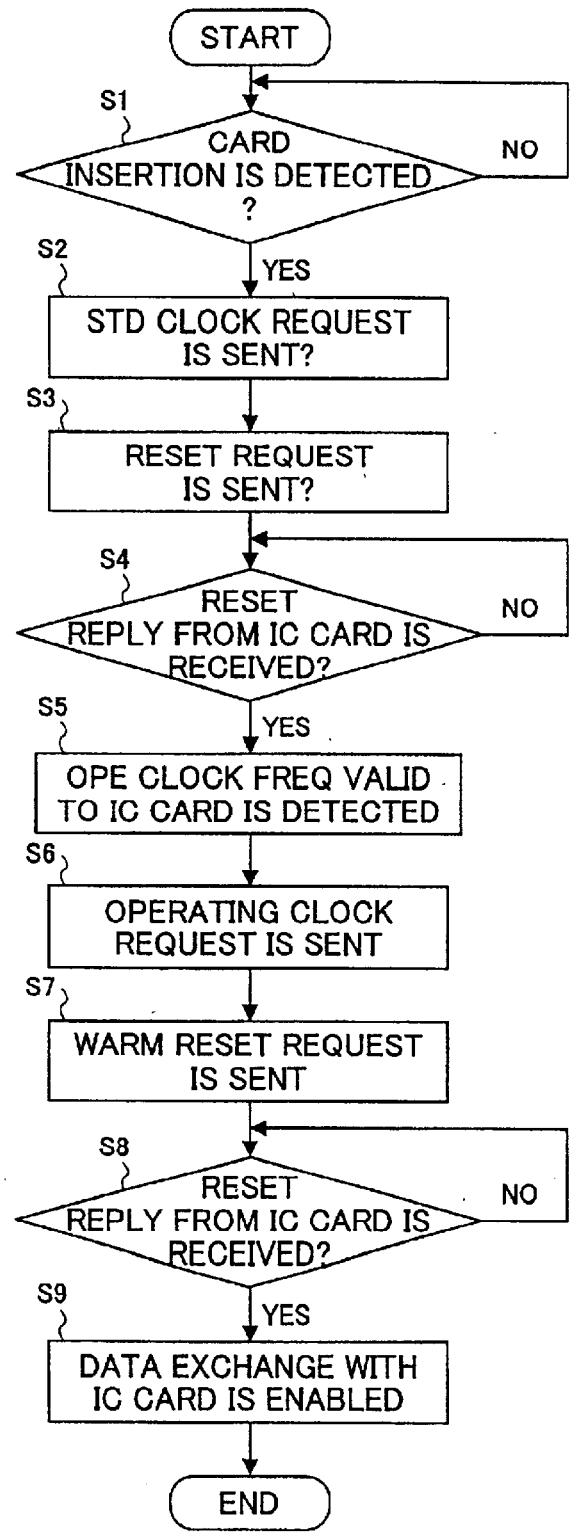
FIG. 2 is a flowchart for explaining a control procedure executed by a CPU to control operation of the IC card reading/writing apparatus of the present embodiment.

FIG. 2 shows a control procedure which is executed by the CPU 22 to control operation of the IC card reading/writing apparatus 1 of the present embodiment.

As shown in FIG. 2, the CPU 22 at step SI determines whether the card insertion signal from the transport control circuit 21 is received. When the result at the step S1 is affirmative, the CPU 22 at step S2 sends a standard clock request to the clock frequency control circuit 25, in order to cause the clock frequency control circuit 25 to selectively output a standard clock signal that is predetermined. As will be described later, the clock frequency control circuit 25 outputs the standard clock signal to the IC card 2 when the standard clock request from the CPU 22 is received.

When the result at the step SI is negative, the control of the CPU 22 is transferred to the step S1, and the CPU 22 repeats the step S1.

After the step S2 is performed, the CPU 22 at step S3 sends a reset request to the reset control circuit 30, in order to cause the reset control circuit 30 to reset the IC card 2. The CPU 22 at step S4 determines whether a reply to the reset request, sent from the IC card 2, is received at the read/write module 11.

Specifically, the reset control circuit 30 sends a reset signal to the IC card 2 via the reset contacts T2 and T12 in response to the reset request supplied from the CPU 22. As described above, when the IC card 2 is inserted and set at the active position, the IC card 2 is inserted and set at its active position, the read/write module 11 and the IC card 2 are electrically connected together at the clock contacts T1 and T11, the reset contacts T2 and T12, and the data contacts T3 and T13. The resent signal from the reset control circuit 30 is delivered to the IC card 2 via the reset contacts T2 and T12. The IC card 2 sends a reply to the reset request back to the data control circuit 31 via the data contacts T3 and T13 in response to the reset signal supplied from the reset control circuit 30, the reply containing system information of the IC card 2. The reset reply from the IC card 2 is received at the data control circuit 31, and the data control circuits supplies the CPU 22 with the reset reply accordingly.

When the result at the step S4 is negative (the reset reply is not received), the control of the CPU 22 is transferred to the step S4, and the CPU 22 repeats the step S4. When the result at the step S4 is affirmative (the reset reply is received), the CPU 22 at step S5 detects an operating clock frequency of the IC card 2 based on the system information contained in the reset reply received from the IC card 2. The operating clock frequency valid to the IC card 2 is described by the system information of the IC card 2.

After the step S5 is performed, the CPU 22 at step S6 sends an operating clock request to the clock frequency control circuit 25 based on the detected clock frequency. As will be described later, in response to the operating clock request supplied from the CPU 22, the clock frequency control circuit 25 selectively outputs one of the clock signals with different clock frequencies, respectively produced by the oscillators 27, 28 and 29, to the IC card 2, the output clock signal having the operating clock frequency of the IC card 2. Therefore, the clock signal having the clock frequency suited to the kind of the inserted IC card 2 is delivered from the clock frequency control circuit 25 to the IC card 2 via the clock contacts T1 and T11.

After the step S6 is performed, the CPU 22 at step S7 sends a warm reset request to the reset control circuit 30. The CPU 22 at step S8 determines whether a reply to the reset request, sent from the IC card 2, is received at the read/write module 11. whether a reply to the reset request, sent from the IC card 2, is received at the read/write module 11. When the result at the step S8 is negative (the reset reply is not received), the control of the CPU 22 is transferred to the step S8, and the CPU 22 repeats the step S8.

When the result at the step S8 is affirmative (the reset reply is received), the CPU 22 at step S9 enables the data control circuit 31 to exchange information between the read/write module 11 and the IC card 2 via the data contacts T3 and T13. After the step S9 is performed, the control procedure of FIG. 2 ends. The CPU 22 accesses the IC card 2 while communicating with the computer system via the interface unit 32, so that the CPU 22 carries out the reading or writing of information from or to the memory 43 of the IC card 2 in accordance with the read or write command supplied from the computer system.

Referring back to FIG. 1, in the IC card reading/writing apparatus 1 of the present embodiment, when an eject button (not shown) is depressed by the operator in order to eject the IC card 2 from the apparatus 1, the card transport module 12 detects the eject button depression and sends a card-ejection detecting signal to the transport control circuit 21. When the card-ejection detecting signal from the card transport module 12 is received, the transport control circuit 21 sends a card ejection request to the CPU 22. As the card ejection request from the transport control circuit 21 is received, the CPU 22 performs a predetermined termination procedure. After the termination procedure is performed, the CPU 22 sends a card-ejection enable signal to the transport control circuit 21, and controls the transport control circuit 21 to reverse the card loading motor of the card transport module 12, so that the card transport module 12 ejects the IC card 2 from the insertion slot of the apparatus 1 by the reversing of the card loading motor.

Next, a description will be provided of the clock frequency control circuit 25 in the IC card reading/writing apparatus 1 of the present embodiment.

As shown in FIG. 1, the system clock oscillator 26 generates system clocks having a basic clock frequency, and supplies such system clocks to each of the CPU 22 and the clock frequency control circuit 25. The clock frequency control circuit 25 operates on the basis of the system clocks supplied from the system clock oscillator 26. As described above, in response to the operating clock request sent from the CPU 22 via a signal line (n), the clock frequency control circuit 25 selectively outputs one of the clock signals with different clock frequencies, respectively generated by the first, second and third oscillators 27, 28 and 29, to the clock contact T1 via a signal line (m). The first, second and third oscillators 27, 28 and 29 generate the clock signals with predetermined clock frequencies, which are suited to the respective kinds of the IC cards, and supply such clock signals to the clock frequency control circuit 25 via signal lines (a), (b) and (c).

Figure 3:
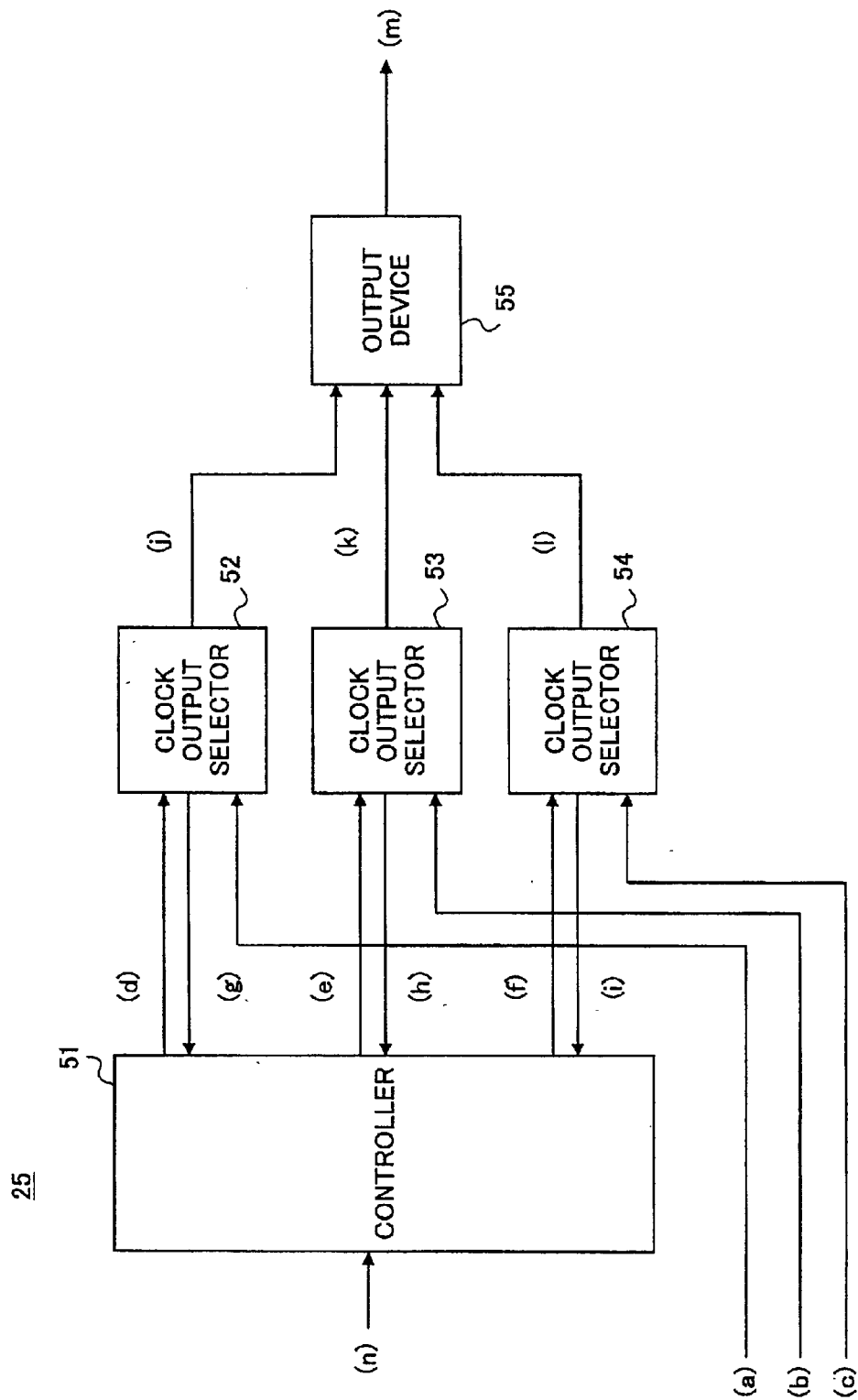
FIG. 3 is a block diagram of a clock frequency control circuit in the IC card reading/writing apparatus of the present embodiment.

FIG. 3 shows a clock frequency control circuit 25 in the IC card reading/writing apparatus of the present embodiment in FIG. 1.

As shown in FIG. 3, the clock frequency control circuit 25 of the present embodiment generally includes a controller 51, a first clock output selector 52, a second clock output selector 53, a third clock output selector 54, and an output device 55. The signal line (n) from the CPU 22 is connected to an input of the controller 51. The signal lines (a), (b) and (c) from the oscillators 27, 28 and 29 are connected to inputs of the clock output selectors 52, 53 and 54, respectively. The controller 51 and the first clock selector 52 are interconnected by signal lines (d) and (g), the controller 51 and the second clock selector 53 are interconnected by signal lines (e) and (h), and the controller 51 and the third clock selector 54 are interconnected by signal lines (f) and (i). A signal line (j) from an output of the clock output selector 52, a signal line (k) from an output of the clock output selector 53 and a signal line (l) from an output of the clock output selector 54 are connected to inputs of the output device 55, respectively. The signal line (m) from an output of the output device 55 is connected to the clock contact T1.

Figure 4:
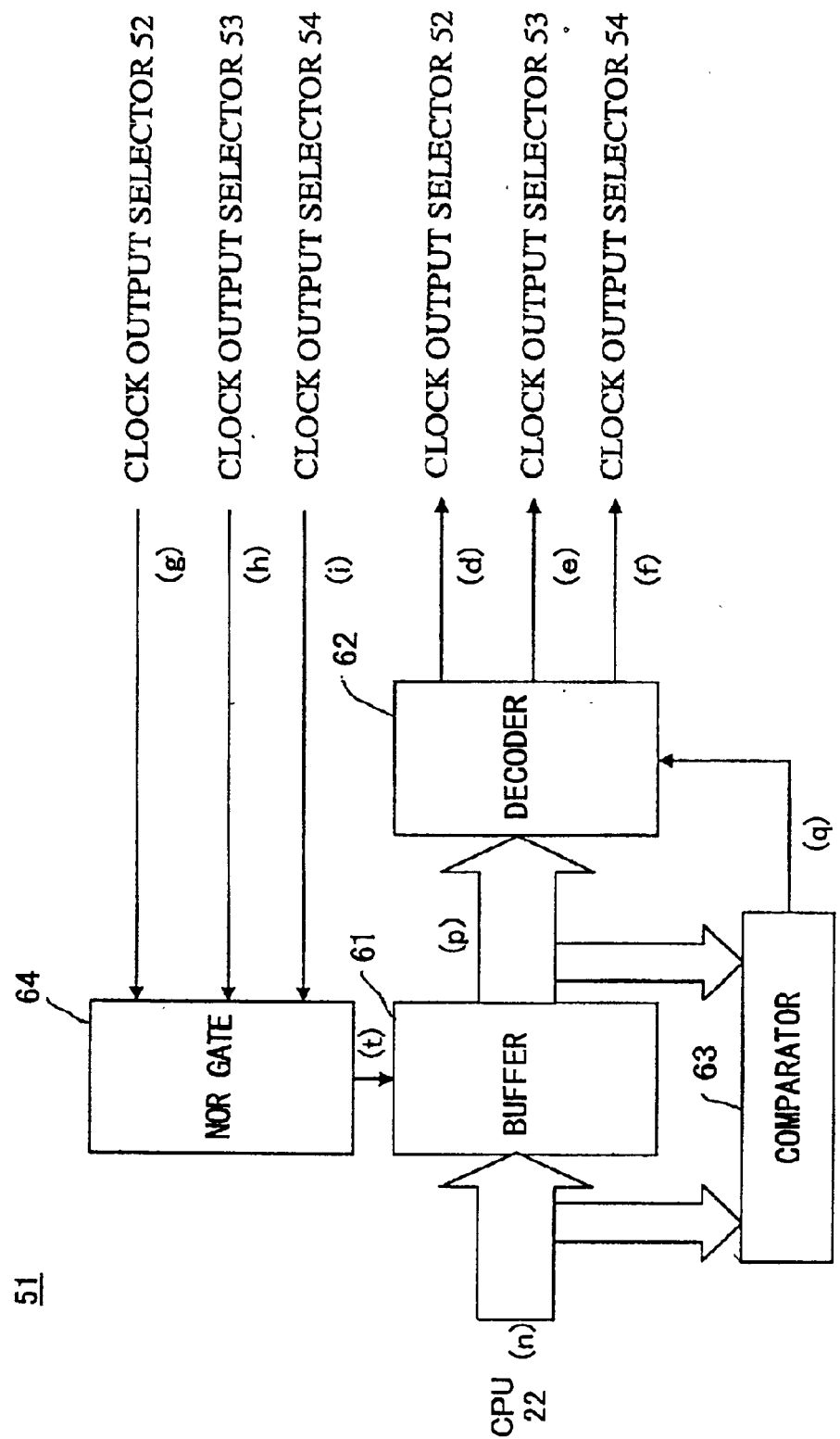
FIG. 4 is a block diagram of a controller of the clock frequency control circuit of the present embodiment.

FIG. 4 shows a controller 51 in the clock frequency control circuit of the present embodiment in FIG. 3.

As shown in FIG. 4, the controller 51 of the present embodiment generally includes a buffer 61, a decoder 62, a comparator 63 and a NOR gate 64. The signal line (n) from the CPU 22 is connected to each of an input of the buffer 61 and an input of the comparator 63. The signal lines (g), (h) and (i) from the clock output selectors 52, 53 and 54 are connected to inputs of the NOR gate 64. A signal line (t)

from an output of the NOR gate 64 is connected to an input of the buffer 61. A signal line (p) from an output of the buffer 61 is connected to each of an input of the decoder 62 and an input of the comparator 63. A signal line (q) from an output of the comparator 63 is connected to an input of the decoder 62. The signal lines (d), (e) and (f) from outputs of the decoder 62 are connected to the clock output selectors 52, 53 and 54, respectively.

In the controller 51 shown in FIG. 4, the buffer 61 retains a code data representative of the operating clock frequency of the IC card 2 (which frequency is detected based on the system information contained in the reset reply from the IC card 2) received from the CPU 22, when the logic level of the output signal (t) of the NOR gate 64 is high. The output signal (p) (i.e., the retained code data) of the buffer 61 is sent to each of the decoder 62 and the comparator 63.

The decoder 62 decodes the code data from the buffer 61 to produce an output signal (d), an output signal (e) and an output signal (f). If the first clock signal (a) is selected according to the operating clock request, these output signals (d), (e) and (f) are set to identify the selected clock signal (a). When the logic level of the output signal (q) of the comparator 63 is high, the output signal (d) of the decoder 62 is activated and set to "1", and it is sent to the first clock output selector 52. Also, the output signal (e) of the decoder 62 is set to "0", and it is sent to the second clock output selector 53. And, the output signal (d) of the decoder 62 is set to "0", and it is sent to the third clock output selector 54. Otherwise the output signals (d), (e) and (f) of the decoder 62 are deactivated and set to "0", and they are sent to the clock output selectors 52, 53 and 54, respectively.

Figure 5:
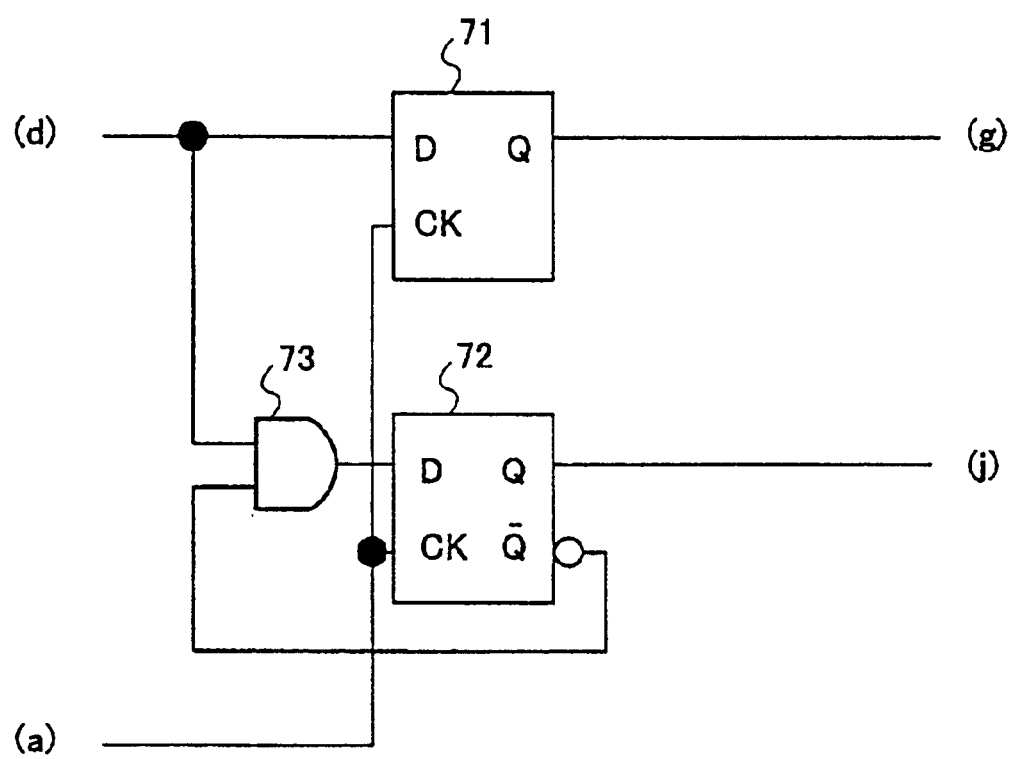
FIG. 5 is a block diagram of a clock output selector in the clock frequency control circuit of the present embodiment.

FIG. 5 shows a clock output selector in the clock frequency control circuit of the present embodiment. For the sake of convenience, only an example of the clock output selector 52 is illustrated. In the present embodiment, the clock output selectors 53 and 54 are configured with elements that are essentially the same as corresponding elements of the clock output selector 52 in FIG. 5, and a description thereof will be omitted.

As shown in FIG. 5, the clock output selector 52 of the present embodiment includes a D flip-flop 71, a D flip-flop 72, and an AND gate 73. The clock output selector 52 is provided with the function to divide the frequency of the output signal (a) (or the first clock signal) of the first oscillator 27 by 2.

In the clock output selector 52 in FIG. 5, the output signal (a) of the oscillator 27 is supplied to a clock input CK of the flip-flop 71, and the output signal (d) of the decoder 62 is supplied to a data input D of the flip-flop 71. When the logic level of the output signal (d) of the decoder 62 is high ("1"), the logic level of the output signal (g) from the output Q of the flip-flop 71 is high ("1"). When the logic level of the output signal (d) of the decoder 62 is low ("0"), the logic level of the output signal (g) from the output Q of the flip-flop 71 is low ("0"). The output signal (g) from the output Q of the flip-flop 71 is supplied to the NOR gate 64.

Further, in the clock output selector 52 in FIG. 5, the output signal (a) of the oscillator 27 is supplied to a clock input CK of the flip-flop 72, and an output signal of the AND gate 73 is supplied to a data input D of the flip-flop 72. The output signal (d) of the decoder 62 is supplied to one of two inputs of the AND gate 73, and the output signal from the inverted output /Q of the flip-flop 72 is supplied to the other input of the AND gate 73. The AND gate 73 provides the flip-flop 72 data input D with the output signal having the level of the AND logic between the output signal (d) of the decoder 62 and the inverted output /Q of the flip-flop 72.

Specifically, when the logic level of the output signal (d) of the decoder 62 is high ("1"), the data input D of the flip-flop 72 is inverted by the inverted output /Q of the flip-flop 72. Namely, the flip-flop 72 provide the function divide the frequency of the output signal (a) (or the first clock signal) of the first oscillator 27 by 2. The output Q of the flip-flop 72 (or the output of the clock output selector 52) provides the clock frequency that is half the clock frequency of the first clock signal. The output signal (j) at the output Q of the flip-flop 72 is sent to the output device 55 as an input signal thereof. The output signal (g) at the output Q of the flip-flop 72 is sent to the NOR gate 64 of the controller 51 as an input signal thereof.

When the logic level of the output signal (d) of the decoder 62 is low ("0"), the data input D of the flip-flop 71 is fixed to "0", and the output signal (g) from the output Q of the flip-flop 71 is set to "0". The output of the AND gate 73 is fixed to "0", and the data input D of the flip-flop 72 is set to "0". The output signal (j) at the output Q of the flip-flop 72, which is set to "0", is sent to the output device 55. The output signal (j) at the output Q of the flip-flop 72 is sent to the output device 55 as an input signal thereof. The output signal (g) at the output Q of the flip-flop 72 is sent to the NOR gate 64 of the controller 51 as an input signal thereof.

As described above, in the present embodiment, the clock output selectors 53 and 54 are configured with the elements that are essentially the same as the corresponding elements of the clock output selector 52. When the logic level of the output signal (e) of the decoder 62 is high ("1"), the output of the clock output selector 53 provides the clock frequency that is half the clock frequency of the second clock signal (b) generated by the oscillator 28. The output signal (h) of the clock output selector 53 at this time is set to "1". On the other hand, when the logic level of the output signal (e) of the decoder 62 is low ("0"), the output signals (k) and (h) of the clock output selector 53 are set to "0". The output signal (k) of the clock output selector 53 is sent to the output device 55 as an input signal thereof. The output signal (h) of the clock output selector 53 is sent to the NOR gate 64 of the controller 51 as an input signal thereof.

When the logic level of the output signal (f) of the decoder 62 is high ("1"), the output of the clock output selector 54 provides the clock frequency that is half the clock frequency of the third clock signal (c) generated by the oscillator 29. The output signal (i) of the clock output selector 54 at this time is set to "1". On the other hand, when the logic level of the output signal (f) of the decoder 62 is low ("0"), the output signals (l) and (i) of the clock output selector 54 are set to "0". The output signal (l) of the clock output selector 54 is sent to the output device 55 as an input signal thereof. The output signal (i) of the clock output selector 54 is sent to the NOR gate 64 of the controller 51 as an input signal thereof.

Figure 6:
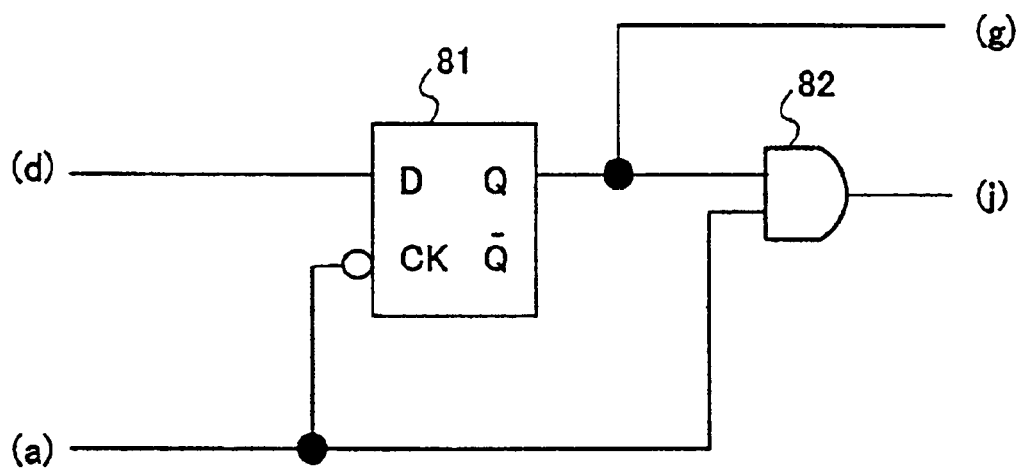
FIG. 6 is a block diagram of a variation of the clock output selector in the clock frequency control circuit of the present embodiment.

FIG. 6 shows a variation of the clock output selector in the clock frequency control circuit of the present embodiment. When there is no need to provide the clock output selector 52 with the frequency dividing function, the clock output selector 52 may be configured as shown in FIG. 6.

Similarly, only an example of the clock output selector 52 is illustrated. In the present embodiment, the clock output selectors 53 and 54 are configured with elements that are essentially the same as corresponding elements of the clock output selector 52 in FIG. 6, and a description thereof will be omitted.

As shown in FIG. 6, the clock output selector 52 of the present embodiment includes a D flip-flop 81 and an AND gate 82. The output signal (a) of the oscillator 27 is supplied to each of a clock input CK of the flip-flop 81 and one of two inputs of the AND gate 82. The output signal (d) of the decoder 62 is supplied to a data input D of the flip-flop 81. The output Q of the flip-flop 81 is sent to the NOR gate 64 of the controller 51 as the output signal (g) of the clock output selector 52, and it is also sent to the other input of the AND gate 82.

In the clock output selector 52 in FIG. 6, when the logic level of the output Q of the flip-flop 81 is high ("1"), the output of the AND gate 82 provides the output signal (a) of the oscillator 27 for the output device 55 as the output signal (j). When the logic level of the output signal (d) of the decoder 62 is low ("0"), the output signal of the AND gate 82 is set to "0", which is supplied to the output device 55 as the signal (j).

In the clock output selector 52 in FIG. 6, when the logic level of the output signal (f) of the decoder 62 is high ("1"), the output signal (g) of the clock output selector 52 is set to "1", and it is sent to the NOR gate 64 of the controller 51. The output signal (j) of the clock output selector 52 at this time provides the clock frequency of the first clock signal (a) generated by the oscillator 27, and it is sent to the output device 55.

As described above, in the present embodiment, the clock output selectors 53 and 54 are configured with the elements that are essentially the same as the corresponding elements of the clock output selector 52 in FIG. 6. When the logic level of the output signal (e) of the decoder 62 is high ("1"), the output signal (h) of the clock output selector 53 is set to "1", and it is sent to the NOR gate 64 of the controller 51. The output signal (k) of the clock output selector 53 at this time provides the clock frequency of the second clock signal (b) generated by the oscillator 28, and it is sent to the output device 55. On the other hand, when the logic level of the output signal (e) of the decoder 62 is low ("0"), the output signals (k) and (h) of the clock output selector 53 are set to "0". The output signal (k) of the clock output selector 53 is sent to the output device 55. The output signal (h) of the clock output selector 53 is sent to the NOR gate 64 of the controller 51.

When the logic level of the output signal (f) of the decoder 62 is high ("1"), the output signal (i) of the clock output selector 54 at this time is set to "1", and it is sent to the NOR gate 64 of the controller 51. The output signal (l) of the clock output selector 54 at this time provides the clock frequency of the third clock signal (c) generated by the oscillator 29, and it is sent to the output device 55. On the other hand, when the logic level of the output signal (f) of the decoder 62 is low ("0"), the output signals (l) and (i) of the clock output selector 54 are set to "0". The output signal (l) of the clock output selector 54 is sent to the output device 55. The output signal (i) of the clock output selector 54 is sent to the NOR gate 64 of the controller 51.

Alternatively, the clock frequency control circuit 25 of the present invention may include the clock output selectors 52, 53 and 54 which are configured into either the embodiment of FIG. 5 or the embodiment of FIG. 6 in any combination.

Next, FIG. 7 is a timing chart for explaining operation of the clock frequency control circuit 25 in the IC card reading/writing apparatus 1 of the present embodiment.

In FIG. 7, (A) indicates the state of the output (n) of the CPU 22, (B) indicates the state of the output (p) of the buffer 61, (C) indicates the state of the output (q) of the comparator 63, (D) indicates the state of the output (t) of the NOR gate 64, (E) indicates the state of the output (d) of the decoder 62, (F) indicates the state of the output (e) of the decoder 62, and (G) indicates the state of the output (a) of the oscillator 27. Moreover, in FIG. 7, (H) indicates the state of the output (j) of the clock output selector 52, (I) indicates the state of the output (g) of the clock output selector 52, (J) indicates the state of the output (b) of the oscillator 28, (K) indicates the state of the output (h) of the clock output selector 53, (L) indicates the state of the output (k) of the clock output selector 53, and (M) indicates the state of the output (m) of the output device 55.

Suppose that, during a time period "T0" in the timing chart of FIG. 7, the clock frequency control circuit 25 is in a stable operating condition, and, in response to the operating clock request supplied from the CPU 22, the output frequency control circuit 25 selectively outputs the output (j) of the clock output selector 52 to the IC card 2 as the output signal (m) of the output device 55.

As indicated by (A) in FIG. 7, during the time period "T0", the operating clock request (or the output signal (n) of the CPU 22) identifies the first clock signal generated by the oscillator 27. As indicated by (B) in FIG. 7, the buffer 61 retains the code data representative of the first clock signal generated by the oscillator 27. Namely, the comparison between the output (n) of the CPU 22 and the output (p) of the buffer 61, performed by the comparator 63 at this time, results in a match, and the logic level of the output (q) of the comparator 63 is high ("1") as indicated by (C) in FIG. 7.

In the clock frequency control circuit 25 of the present embodiment, when the logic level of the output (q) of the comparator 63 is high ("1"), the decoder 62 is activated (or asserted) to output the signals (d), (e) and (f) to the clock output selectors 52, 53 and 54. As indicated by (E) in FIG. 7, during the time period "T0", the output signal (d) of the decoder 62, which is set to "1", is sent to the clock output selector 52. In this case, the signal (d) acts to request the clock output selector 52 to selectively output the first clock signal (a) to the output device 55. As indicated by (F) in FIG. 7, the output signal (e) of the decoder 62, which is set to "0", is sent to the clock output selector 52. In this case, the signal (e) does not act to request the clock output selector 53 to selectively output the second clock signal (b) to the output device 55.

Meanwhile, as indicated by (D) in FIG. 7, during the time period "T0", the output signal (t) of the NOR gate 64 is set to "0". When the logic level of the output signal (t) of the NOR gate 64 is low ("0"), the buffer 61 is set in the holding condition. Hence, the output signal (n) of the CPU 22 (or an operating clock request) is not loaded into the buffer 61 at this time.

Suppose that, at a time "t1" in the timing chart of FIG. 7, the operating clock request (the output signal (n)) supplied from the CPU 22 is changed to identify the second clock signal generated by the oscillator 28 as indicated by (A) in FIG. 7. The comparison between the output (n) of the CPU 22 and the output (p) of the buffer 61 by the comparator 63 at this time results in a mismatch, and the logic level of the output (q) of the comparator 63 is low ("0") as indicated by (C) in FIG. 7.

In the clock frequency control circuit 25 of the present embodiment, when the logic level of the output (q) of the comparator 63 is low ("0"), the output signal (d) of the decoder 62 is deactivated (or negated). As indicated by (E) in FIG. 7, after the time period "t1", the output signal (d) of the decoder 62 is set to "0", and it is sent to the clock output selector 52. Namely, in this case, the decoder 62 does not act to request the clock output selector 52 to selectively output the first clock signal (a) to the output device 55. Namely, the clock output request that has been made to the clock output selector 52 is canceled by the logic low level of the output signal (d) of the decoder 62.

When the logic level of the output signal (d) of the decoder 62 is low ("0"), the output signal (g) of the clock output selector 52 is set to "0" as indicated (I) in FIG. 7. Also, the output signal (j) of the clock output selector 52 remains at the logic low level ("0") as indicated by (H) in FIG. 7. This causes the output signal (t) of the NOR gate 64 to be set to "1" as indicated (D) in FIG. 7.

When the logic level of the output signal (t) of the NOR gate 64 is high ("1"), the buffer 61 is set in the loading condition. Hence, the output signal (n) of the CPU 22 (or the operating clock request) is loaded into the buffer 61 at this time. As described above, the operating clock request in the buffer 61 at this time identifies the second clock signal generated by the oscillator 28. The output signal (p) of the buffer 61 is set to identify the second clock signal generated by the oscillator 28 as indicated by (B) in FIG. 7. Hence, the comparison between the output (n) of the CPU 22 and the output (p) of the buffer 61, performed by the comparator 63 at this time, results in a match, and the logic level of the output (q) of the comparator 63 is high ("1") as indicated by (C) in FIG. 7.

As indicated by (F) in FIG. 7, after the match occurs at the comparator 63, the output signal (e) of the decoder 62 is set to "1", and it is sent to the clock output selector 53. In this case, the selector 53 acts to request the clock output selector 53 to selectively output the second clock signal (b) to the output device 55. As indicated by (K) in FIG. 7, the output signal (h) of the selector 53 is set to "1", and it is sent to the NOR gate 64. After this, the output signal (k) of the selector 53 is set to "1" as indicated by (L) in FIG. 7. In this condition, the output frequency control circuit 25 selectively outputs the output signal (k) of the clock output selector 53 to the IC card 2 as the output signal (m) of the output device 55 as indicated by (M) in FIG. 7.

In the above-described embodiment, the switching between the output signal (j) of the clock output selector 52 and the output signal (k) of the clock output selector 53 is performed by the clock frequency control circuit 25. In a manner similar to that in the timing chart of FIG. 7, the clock frequency control circuit 25 of the present invention is capable of performing the switching between the output signal (j) of the clock output selector 52 and the output signal (l) of the clock output selector 54, as well as the switching between the output signal (l) of the clock output selector 54 and the output signal (k) of the clock output selector 53.

Further, in the above-described embodiment, the clock frequency control circuit 25 of the present invention deals with the switching of the clock signals of the three kinds with different clock frequencies. By increasing the number of the input/output bits of the buffer 61 and the decoder 62 and providing a corresponding number of the oscillators and a corresponding number of the clock output selectors, it is possible that the clock frequency control circuit 25 of the present invention selectively output one of more than three clock signals with different frequencies in order to access IC cards of more than three kinds.

The present invention is not limited to the above-described embodiments, and variations and modifications may be made without departing from the scope of the present invention.

Further, the present invention is based on Japanese priority application No. 2001-234055, filed on Aug. 1, 2001, the entire contents of which are hereby incorporated by reference.

What is claimed is:

1. A clock frequency control method, comprising the steps of:
providing a plurality of clock output selectors which respectively provide output clock signals based on input clock signals with different frequencies at respective selector inputs; and
controlling one of the plurality of clock output selectors in response to an operating clock request to provide a selected clock signal among the output clock signals in accordance with a first indication of the request, wherein when the first indication of the request is chanced to a second indication, the selected clock signal is deactivated in synchronism with a corresponding one of said input clock signals; and after the selected clock signal is deactivated, a second selected clock signal in response to the second indication of the request is activated in synchronism with a corresponding one of said input clock signals,
wherein said controlling step comprises:
storing the first indication of the request before a clock signal change into a buffer;
comparing the first indication of the buffer with the second indication of the request after the clock signal change, to output a control signal based on a result of the comparison;
controlling one of the plurality of clock output selectors in response to the control signal such that, when the result of the comparison is a match, one of the plurality of clock output selectors is activated, and, when the result of the comparison is a mismatch, one of the plurality of clock output selectors is deactivated; and
allowing the buffer to store information indicated by the request after the plurality of clock output selectors are deactivated.

2. The clock frequency control method according to claim 1, wherein the operating clock request includes an indication that identifies an operating clock frequency of an external device contained in system information of a reset reply received from the external device.

3. A clock frequency control device, comprising:
a plurality of clock output selectors respectively providing output clock signals based on input clock signals with different frequencies at respective selector inputs; and
a controller controlling one of the plurality of clock output selectors in response to an operating clock request to provide a selected clock signal among the output clock signals in accordance with a first indication of the request, wherein said controller deactivates, when the first indication of the request is changed to a second indication, the selected clock signal in synchronism with a corresponding one of said input clock signals, and activates, after the selected clock signal is deactivated, a second selected clock signal in response to the second indication of the request in synchronism with a corresponding one of said input clock signals,
wherein said controller comprises:
a buffer storing the first indication of the operating clock request before a clock signal change;
a comparator comparing the first indication of the buffer with the second indication of the operating clock request after the clock signal change, the comparator outputting a control signal based on a result of the comparison;
a decoder controlling one of the plurality of clock output selectors in response to the control signal of the comparator, said decoder activating, when the result of the comparison is a match, one of the plurality of clock output selectors, and said decoder deactivating, when the result of the comparison is a mismatch, one of the plurality of clock output selectors; and a logic gate allowing the buffer to store information indicated by the operating clock request after the plurality of clock output selectors are deactivated.

4. The clock frequency control device according to claim 3, wherein at least one of the plurality of clock output selectors comprises:

a first flip-flop having a data input receiving the control signal from the decoder, a clock input receiving one of the input clock signals, and an output sending a control signal to the logic gate of the controller;

a second flip-flop having a data input, a clock input receiving said one of the input clock signals, a non-inverted output sending the selected clock signal with a divided clock frequency, and an inverted output; and an AND gate having a first input receiving the control signal from the decoder, a second input receiving a signal from the inverted output of the second flip-flop, and an output sending a data signal to the data input of the second flip-flop.

5. The clock frequency control device according to claim 3, wherein at least one of the plurality of clock output selectors comprises:

a flip-flop having a data input receiving the control signal from the decoder, a clock input receiving one of the input clock signals, and an output sending a control signal to the logic gate of the controller; and an AND gate having a first input receiving the control signal from the output of the flip-flop, a second input receiving said one of the input clock signals, and an output sending the selected clock signal.

6. An IC card reading/writing apparatus which includes a clock frequency control device for providing a computer system with read/write functions to read information from an IC card and to write information to the IC card, said clock frequency control device comprising:

a plurality of clock output selectors respectively providing output clock signals based on input clock signals with different frequencies at respective selector inputs; and a controller controlling one of the plurality of clock output selectors in response to an operating clock request to provide a selected clock signal among the output clock signals in accordance with a first indication of the request, wherein said controller deactivates, when the first indication of the request is changed to a second indication, the selected clock signal in synchronism with a corresponding one of said input clock signals, and activates, after the selected clock signal is deactivated, a second selected clock signal in response to the second indication of the request in synchronism with a corresponding one of said input clock signals, wherein the controller comprises:

a buffer storing the first indication of the operating clock request before a clock signal change;

a comparator comparing the first indication of the buffer with the second indication of the operating clock request after the clock signal change, the comparator outputting a control signal based on a result of the comparison;

a decoder controlling one of the plurality of clock output selectors in response to the control signal of the comparator, said decoder activating, when the result of the comparison is a match, one of the plurality of clock output selectors, and said decoder deactivating, when the result of the comparison is a mismatch, one of the plurality of clock output selectors; and a logic gate allowing the buffer to store information indicated by the operating clock request after the plurality of clock output selectors are deactivated.

7. The IC card reading/writing apparatus according to claim 6, wherein the operating clock request includes an indication that identifies an operating clock frequency of the IC card contained in system information of a reset reply received from the IC card.

* * * * *